United States Patent
Lee et al.

(10) Patent No.: US 9,413,026 B2
(45) Date of Patent: Aug. 9, 2016

(54) ELECTRICITY GENERATION UNIT AND FUEL CELL STACK

(75) Inventors: Jin-Hwa Lee, Yongin-si (KR); Tae-Yoon Kim, Yongin-si (KR); Geun-Seok Chai, Yongin-si (KR); Sung-Yong Cho, Yongin-si (KR); Hee-Tak Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 205 days.

(21) Appl. No.: 13/586,817

(22) Filed: Aug. 15, 2012

(65) Prior Publication Data

US 2013/0059224 A1 Mar. 7, 2013

(30) Foreign Application Priority Data

Sep. 6, 2011 (KR) ........................ 10-2011-0090369

(51) Int. Cl.
*H01M 8/02* (2016.01)
*H01M 8/24* (2016.01)
*H01M 8/10* (2016.01)

(52) U.S. Cl.
CPC ............ *H01M 8/241* (2013.01); *H01M 8/0204* (2013.01); *H01M 8/0247* (2013.01); *H01M 8/1002* (2013.01); *Y02E 60/521* (2013.01)

(58) Field of Classification Search
CPC .................................................. H01M 8/0204
USPC .................................. 429/514, 519–522, 457
See application file for complete search history.

(56) References Cited

U.S. PATENT DOCUMENTS

| | | | | |
|---|---|---|---|---|
| 3,969,145 | A * | 7/1976 | Grevstad et al. | 429/437 |
| 2003/0235735 | A1 * | 12/2003 | Miyazawa et al. | 429/26 |
| 2005/0214618 | A1 * | 9/2005 | Oh | C23C 30/00 429/514 |
| 2008/0280177 | A1 | 11/2008 | Ose et al. | |

FOREIGN PATENT DOCUMENTS

| | | |
|---|---|---|
| JP | 09-289026 | 11/1997 |
| JP | 2004-103477 | 4/2004 |
| JP | 2007-109425 | 4/2007 |
| JP | 2010-073564 | 4/2010 |
| KR | 10-2006-0065757 A | 6/2006 |

OTHER PUBLICATIONS

English Machine Translation of JP Patent Publication No. 09-289026 dated Nov. 4, 1997, 9 pages.
English Machine Translation of JP Patent Publication No. 2004-103477 dated Apr. 2, 2004, 12 pages.
KIPO NOA No. 10-2011-0090369, dated Apr. 10, 2013, 5 pages.
Machine English Translation of JP 2010-073564 dated Apr. 2, 2010, 10 pages.

* cited by examiner

*Primary Examiner* — Jonathan G Leong
(74) *Attorney, Agent, or Firm* — Lewis Roca Rothgerber Christie LLP

(57) ABSTRACT

An electricity generator includes a membrane electrode assembly; a separator coupled to the membrane electrode assembly and including a first region and a second region; and a thermal conductor on one of the first region and the second region.

6 Claims, 9 Drawing Sheets

ELECTRICITY GENERATION UNIT AND FUEL CELL STACK

CROSS-REFERENCE TO RELATED APPLICATION

This application claims priority to and the benefit of Korean Patent Application No. 10-2011-0090369 filed in the Korean Intellectual Property Office on Sep. 6, 2011, the entire content of which is incorporated herein by reference.

BACKGROUND

1. Field

The described technology relates generally to an electricity generator and a fuel cell stack.

2. Description of Related Art

An electricity generator includes a membrane electrode assembly (MEA) and a separator (also called a bipolar plate) coupled to the MEA.

Typically, the MEA includes an electrolyte membrane, an anode that is positioned at one side of the electrolyte membrane, and a cathode that is positioned at the other side of the electrolyte membrane. The separator forms a fuel channel at one surface toward the anode to supply fuel to the anode, and forms an oxidant channel at one surface toward the cathode to supply an oxidizing agent to the cathode. Electrical energy is generated by a hydrogen oxidation reaction of the anode and an oxygen reduction reaction of the cathode, and heat and water are additionally generated.

Further, non-reacted oxidant and non-reacted fuel that are not used for the oxidation reaction and the reduction reaction from the oxidant and the fuel that are supplied to the oxidant channel and the fuel channel, respectively, are discharged to the outside from the oxidant channel and the fuel channel. In this instance, the non-reacted oxidant and the non-reacted fuel may have a higher temperature because of the heat generated by the oxidation reaction and the reduction reaction than the oxidant and the fuel that are supplied to the oxidant channel and the fuel channel.

Therefore, the temperature of the separator at a region from which the non-reaction oxidant and the non-reaction fuel are discharged may become higher than at any other parts of the separator so the temperature distribution of the separator may not be uniform.

Further, the fuel cell stack includes a plurality of electricity generators, a pressurization plate for pressurizing and supporting the electricity generators, and a heat insulating member installed between the pressurization plate and the outermost electricity generator.

When the electricity generator generates electricity by the oxidation and reduction reaction, heat is also generated. In this instance, the temperature at the electricity generators provided in the center of the fuel cell stack can be higher than the temperature of the electricity generators that are provided near the heat insulating member. Therefore, the temperature distribution for the entire fuel cell stack may be non-uniform.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide an electricity generator for providing a substantially uniform temperature distribution of a separator by combining the separator with materials having different thermal conductivity.

The described technology also provides a fuel cell stack for providing a substantially uniform temperature distribution by combining a plurality of separators with materials having different thermal conductivity.

An exemplary embodiment includes an electricity generator having a membrane electrode assembly; a separator coupled to the membrane electrode assembly and including a first region and a second region; and a thermal conductor on one of the first region and the second region.

In one embodiment, the separator includes a first separator having a fuel inlet and a fuel outlet; and a second separator having an oxidant inlet and an oxidant outlet, wherein the first region includes the fuel outlet and the oxidant outlet and the second region includes the fuel inlet and the oxidant inlet. Further, in one embodiment, the thermal conductor includes a first thermal conductor having a thermal conductivity that is less than a thermal conductivity of the separator, and wherein the first thermal conductor is coated on or is integral with the first region.

In one embodiment, the thermal conductor includes a second thermal conductor having a thermal conductivity that is greater than a thermal conductivity of the separator, and wherein the second thermal conductor is coated on or is integral with the second region.

In another embodiment, a fuel cell stack includes a plurality of electricity generators comprising a plurality of separators, wherein one of the separators is attached to either end of a membrane electrode assembly; a pressurization plate for pressurizing and supporting the electricity generators; and a thermal conductor on the separator and comprising materials having a different thermal conductivity from each other.

In one embodiment, the thermal conductor includes a first thermal conductor having a thermal conductivity that is less than a thermal conductivity of the separator. Further, the first thermal conductor may be coated on or be integral with ones of the separators that are located within about the middle 50% of the separators of the fuel cell stack.

In one embodiment, the thermal conductor includes a second thermal conductor having a thermal conductivity that is greater than a thermal conductivity of the separator. Further, the second thermal conductor may be coated on or may be integral with ones of the separators that are located within about an outer 25% of the separators of the fuel cell stack.

According to the embodiments, the entire temperature distribution of the separators of the electricity generator can be made substantially uniform.

Further, according to another exemplary embodiment, the entire temperature distribution of the fuel cell stack can be substantially uniform.

DETAILED DESCRIPTION OF THE EMBODIMENTS

Figure 1:
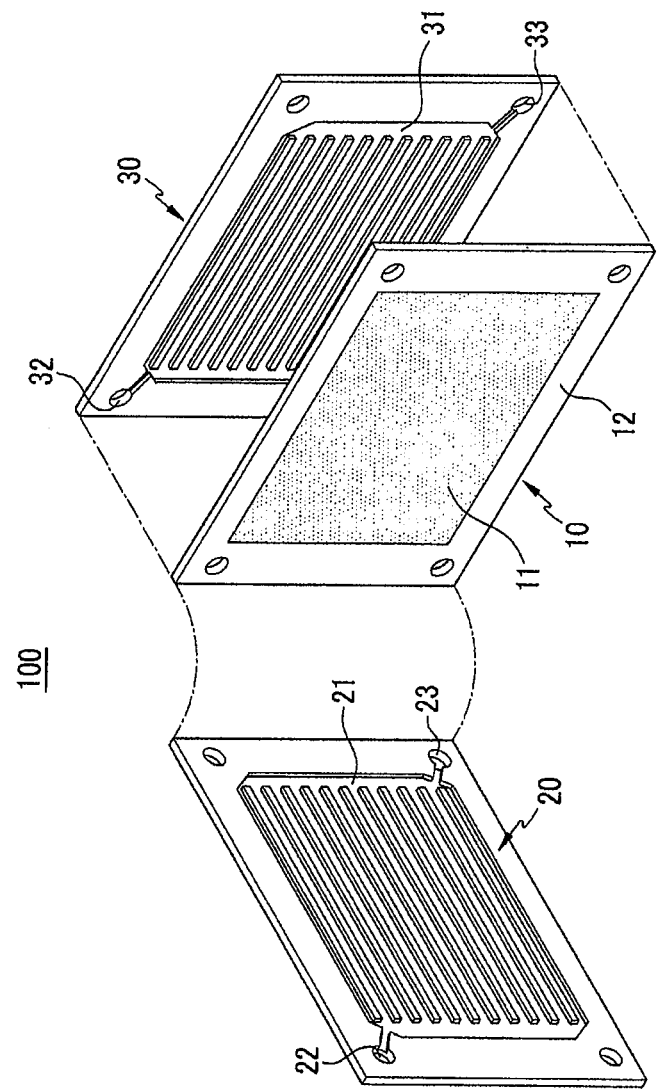
FIG. 1 shows an exploded perspective view of an electricity generator according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 shows an exploded perspective view of an electricity generator according to a first exemplary embodiment of the present invention.

Referring to FIG. 1, the electricity generator includes a membrane electrode assembly 10 and a pair of separators 20 and 30 closely attached to respective sides of the membrane electrode assembly 10.

The membrane electrode assembly 10 includes an electrolyte film 11, a cathode 12 contacting a first surface of the electrolyte film 11, and an anode 13 (FIG. 3) contacting a second surface of the electrolyte film 11 on the opposite side of the cathode 12.

Also, the pair of separators 20 and 30 include a first separator 20 closely attached to the cathode 12 (hereinafter, a cathode separator) and a second separator 30 closely attached to the anode 13 (hereinafter, an anode separator).

In further detail, an oxidant inlet 22 and an oxidant outlet 23 are formed on an edge of the cathode separator 20. Also, an oxidant channel 21 formed as a concave groove connected to the oxidant inlet 22 and the oxidant outlet 23 can be formed in the separator 20. Therefore, the oxidant input to the oxidant inlet 22 passes through the oxidant channel 21 and is then discharged to the oxidant outlet 23.

Further, a fuel inlet 32 and a fuel outlet 33 are formed on the edge of the anode separator 30. Here, the fuel inlet 32 and the fuel outlet 33 are connected to a fuel channel 31 formed as a concave groove so the fuel supplied to the fuel inlet 32 passes through the fuel channel and is discharged to the fuel outlet 33.

Figure 2:
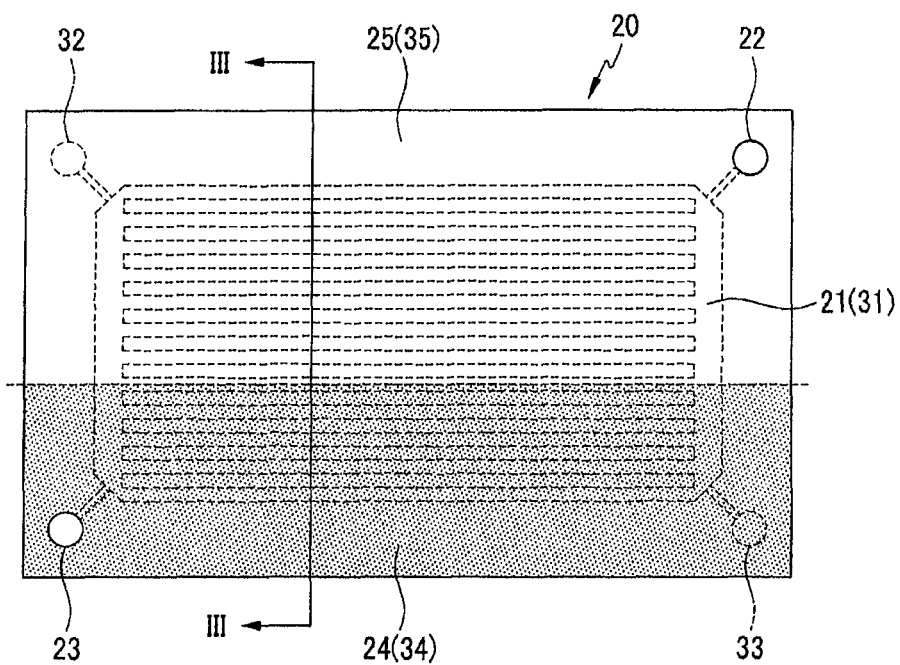
FIG. 2 shows a top plan view of the electricity generator shown in FIG. 1.
Figure 3:
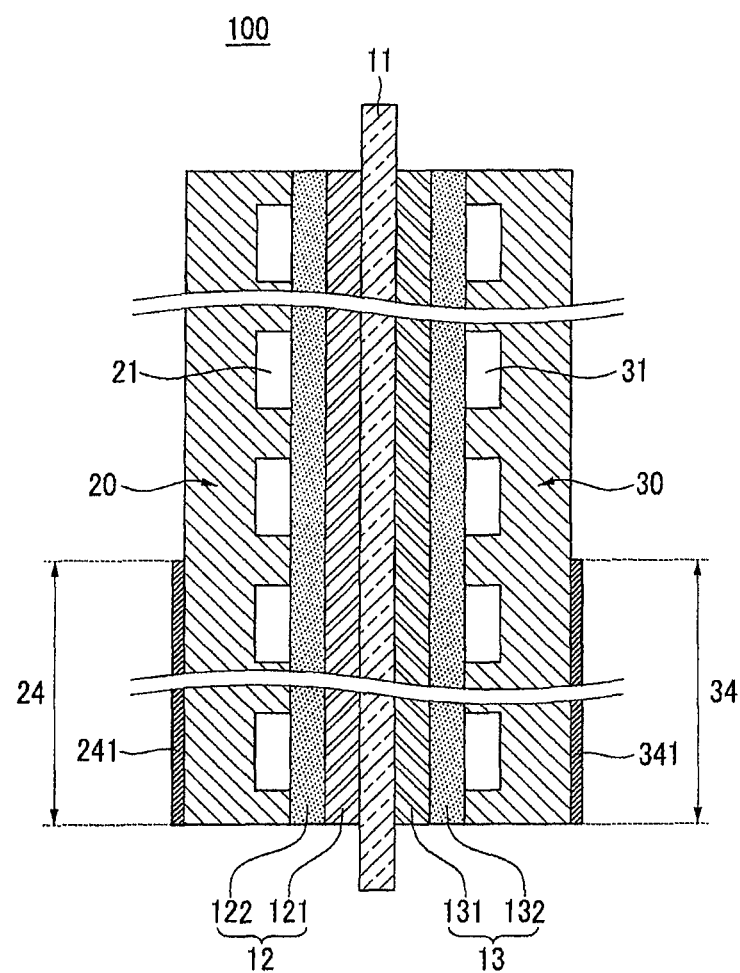
FIG. 3 shows a cross-sectional view with respect to a line III-III of FIG. 2.

FIG. 2 shows a top plan view of an electricity generator 100 shown in FIG. 1, and FIG. 3 shows a cross-sectional view with respect to a line III-III of FIG. 2.

Referring to FIG. 2 and FIG. 3, the cathode separator 20 includes a first region or a first part 24 formed at the oxidant outlet 23 and a second region or a second part 25 formed at the oxidant inlet 22. Further, the anode separator 30 includes a first region or a first part 34 formed at the fuel outlet 33 and a second region or a second part 35 formed at the fuel inlet 32.

An oxidant channel 21 and a fuel channel 31 are formed on respective sides toward the cathode 12 and the anode 13 in the cathode and anode separators 20 and 30 to supply the oxidant and the fuel to the cathode 12 and the anode 13 through the oxidant inlet 22 and the fuel inlet 32.

The cathode 12 includes a catalyst layer 121 for allowing the oxygen to be changed into electrons and oxygen ions by the reduction reaction by using the oxidant supplied to the oxidant channel 21 through the oxidant inlet 22, and a gas diffusion layer 122 contacting an outer surface of the catalyst layer 121 and increasing mobility of the electrons and the oxygen ions. Also, the anode 13 includes a catalyst layer 131 for changing the hydrogen in the fuel into electrons and hydrogen ions by the oxidation reaction, and a gas diffusion layer 132 contacting an outer surface of the catalyst layer 31 and increasing mobility of the electrons and the hydrogen ions.

Here, the cathode and anode separators 20 and 30 can function as conductors for coupling the cathode 12 of the membrane electrode assembly 10 provided on a first side and the anode 13 of the membrane electrode assembly 10 provided on a second side in series.

Further, thermal conductors 241 and 341 generated by at least one thermal conductor having different thermal conductivity from the thermal conductivity (substantially 20 W/(m·K)) of the separator can be combined with either of the first parts 24 and 34 formed on the oxidant outlet 23 and the fuel outlet 33, respectively, or the second parts 25 and 35 formed on the oxidant inlet 22 and the fuel inlet 32, respectively.

However, the present invention is not restricted thereto, and the thermal conductors 241 and 341 can be combined with one of the first parts 24 and 34 formed on the oxidant outlet 23 and the fuel outlet 33, respectively.

The thermal conductors 241 and 341 will now be described in detail.

A certain amount of the oxidant and the fuel supplied to the cathode 12 and the anode 13 may not be used for the electrochemical reaction but can be discharged to the outside of the electricity generator through the oxidant outlet 23 and the fuel outlet 33. In this instance, the non-reacted oxidant and the non-reacted fuel discharged to the outside through the oxidant outlet 23 and the fuel outlet 33 can have a higher temperature than the oxidant and the fuel that are supplied to the membrane electrode assembly 10 through the oxidant inlet 22 and the fuel inlet 32 caused by the heat generated by the electrochemical reaction at the membrane electrode assembly 10.

Therefore, when a material having thermal conductivity that is less than the thermal conductivity (substantially 20 W/(m·K)) of the second parts 25 and 35 is coated on and combined to the first part 24 and 34 through impregnation, the temperature of the first parts 24 and 34 can become substantially equivalent to the temperature of the second parts 25 and 35.

In this instance, the material that can be coated on the first parts 24 and 34 includes, for example, polypropylene (with thermal conductivity of substantially 0.1-0.22 W/(m·K)), polyethylene (with thermal conductivity of substantially 0.42-0.51 W/(m·K)), and vinyl ester (with thermal conductivity of substantially 0.25 W/(m·K)).

Figure 4:
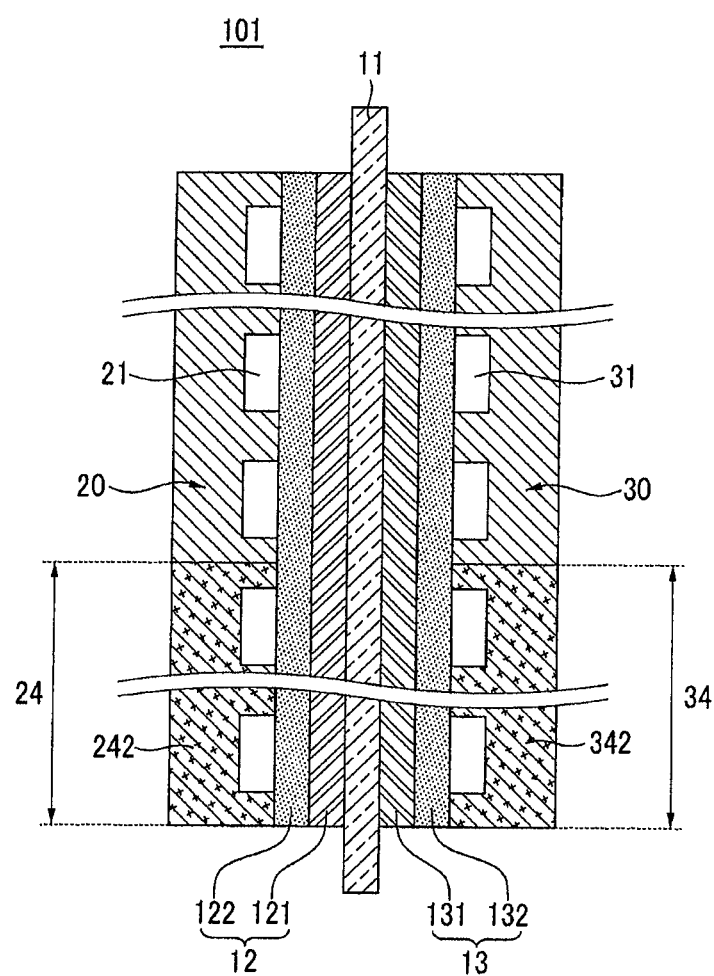
FIG. 4 shows a cross-sectional view of an electricity generator according to an exemplary variation of the first exemplary embodiment of the present invention.

FIG. 4 shows a cross-sectional view of an electricity generator according to an exemplary variation of the first exemplary embodiment of the present invention.

Referring to FIG. 4, an electricity generator 101 has an equivalent configuration to the electricity generator 100 according to the first exemplary embodiment except for thermal conductors 242 and 342 so no repeated description will be provided.

The first parts 24 and 34 can include the thermal conductors 242 and 342 including at least one thermal conductor having thermal conductivity that is less than the configuration forming the second parts 25 and 35. That is, the first parts 24 and 34 can be configured to integrally include at least one thermal conductor having thermal conductivity that is less than the thermal conductivity (substantially 20 W/(m·K)) of the second parts 25 and 35.

Also, the first parts 24 and 34 can be separately manufactured from the second parts 25 and 35 so it is possible to integrally combine the first parts 24 and 34 and the second parts 25 and 35 and use them for the electricity generator 101.

Therefore, the thermal conductivity of the first parts 24 and 34 becomes lower than the thermal conductivity of the second parts 25 and 35 so the temperature distribution at the first parts 24 and 34 can be substantially equivalent to the temperature distribution at the second parts 25 and 35.

In this instance, materials for the first parts 24 and 34 include, for example, polypropylene (with thermal conductivity of substantially 0.1-0.22 W/(m·K)), polyethylene (with thermal conductivity of substantially 0.42-0.51 W/(m·K)), and vinyl ester (with thermal conductivity of substantially 0.25 W/(m·K)).

Figure 5:
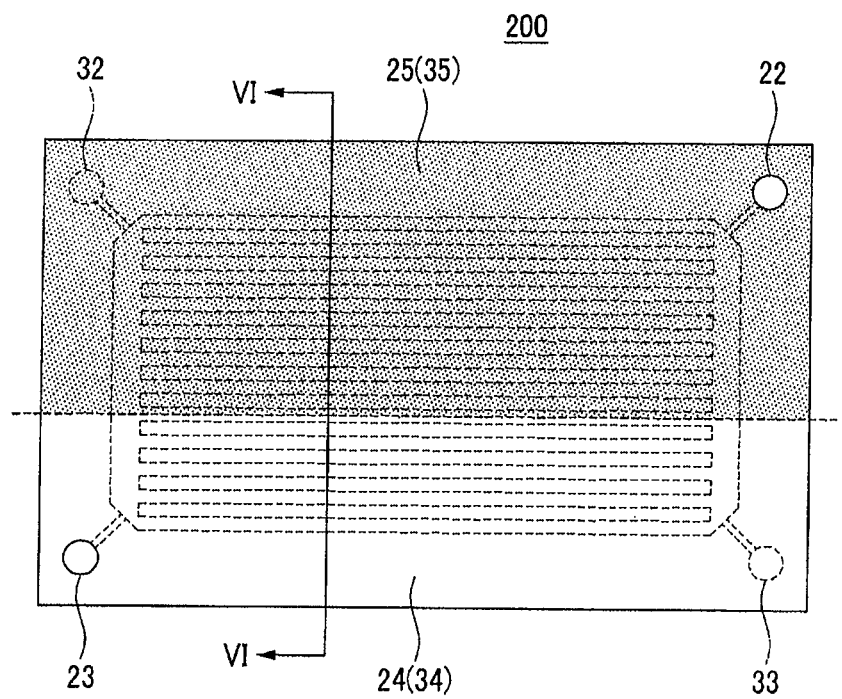
FIG. 5 shows a top plan view of an electricity generator according to a second exemplary embodiment of the present invention.
Figure 6:
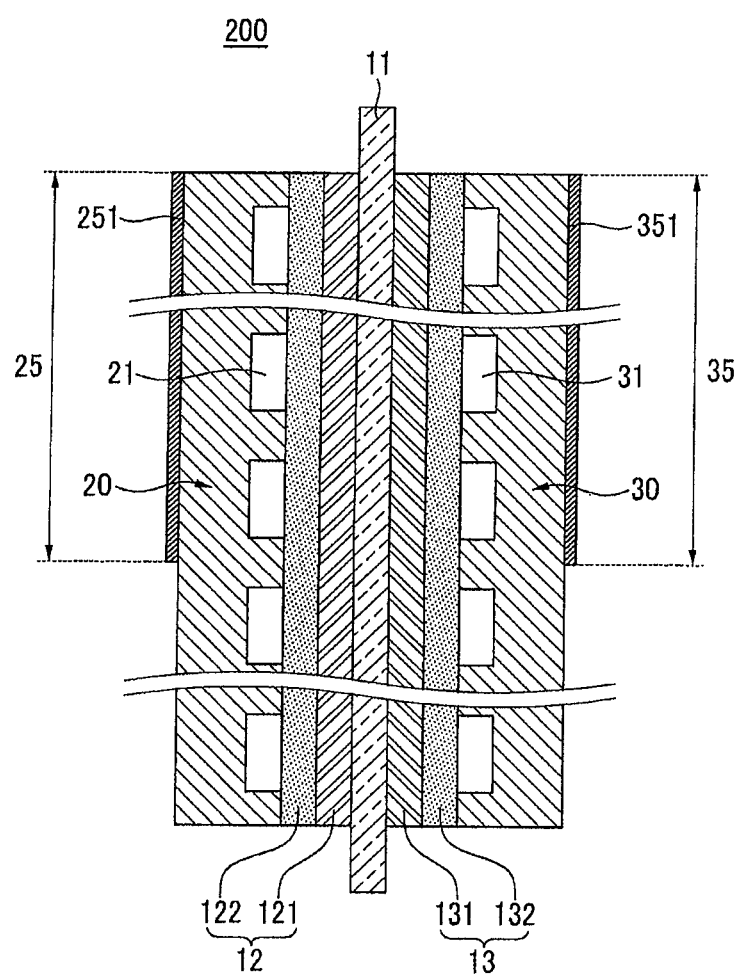
FIG. 6 shows a cross-sectional view with respect to a line VI-VI of FIG. 5.

FIG. 5 shows a top plan view of an electricity generator according to a second exemplary embodiment of the present invention, and FIG. 6 shows a cross-sectional view with respect to a line VI-VI of FIG. 5.

Referring to FIG. 5 and FIG. 6, an electricity generator 200 is substantially equivalent to the electricity generator 100 according to the first exemplary embodiment except for thermal conductors 251 and 351.

The thermal conductors 251 and 351 including at least one thermal conductor having thermal conductivity that is greater than the thermal conductivity of the cathode and anode separators 20 and 30 can be coated to and combined with the second parts 25 and 35 of the electricity generator 200 through impregnation. In this instance, since the cathode and anode separators 20 and 30 can be formed to integrally include a metal, the thermal conductivity can be several to several tens of times greater than the thermal conductivity of the separators according to the first exemplary embodiment.

Hence, when a material having thermal conductivity that is greater than the thermal conductivity of the first parts 24 and 34 is coated on and combined to the second parts 25 and 35 through impregnation, the temperature of the first parts 24 and 34 can be substantially equivalent to the temperature of the second parts 25 and 35.

Here, the material that can be coated on the second parts 25 and 35 includes, for example, aluminum (with thermal conductivity of substantially 250 W/(m·K)), copper (with thermal conductivity of substantially 401 W/(m·K)), gold (with thermal conductivity of substantially 310 W/(m·K)), and nickel (with thermal conductivity of substantially 91 W/(m·K)).

Further, although not described in the present exemplary embodiment, the embodiment of the present invention can be realized by coating the thermal conductor having thermal conductivity that is less than that of the material that is coated on the second parts 25 and 35 on the first parts 24 and 34 through impregnation.

In other words, it is possible to control the temperature of the first parts 24 and 34 to be substantially equivalent to the temperature of the second parts 25 and 35 by coating a material having thermal conductivity that is lower than the thermal conductivity of the cathode and anode separators 20 and 30 on the first parts 24 and 34 according to the thermal conductivity of the cathode and anode separators 20 and 30 according to the embodiment of the present invention, and coating a thermal conductor having thermal conductivity that is greater than the thermal conductivity of the cathode and anode separators 20 and 30 on the second parts 25 and 35.

Figure 7:
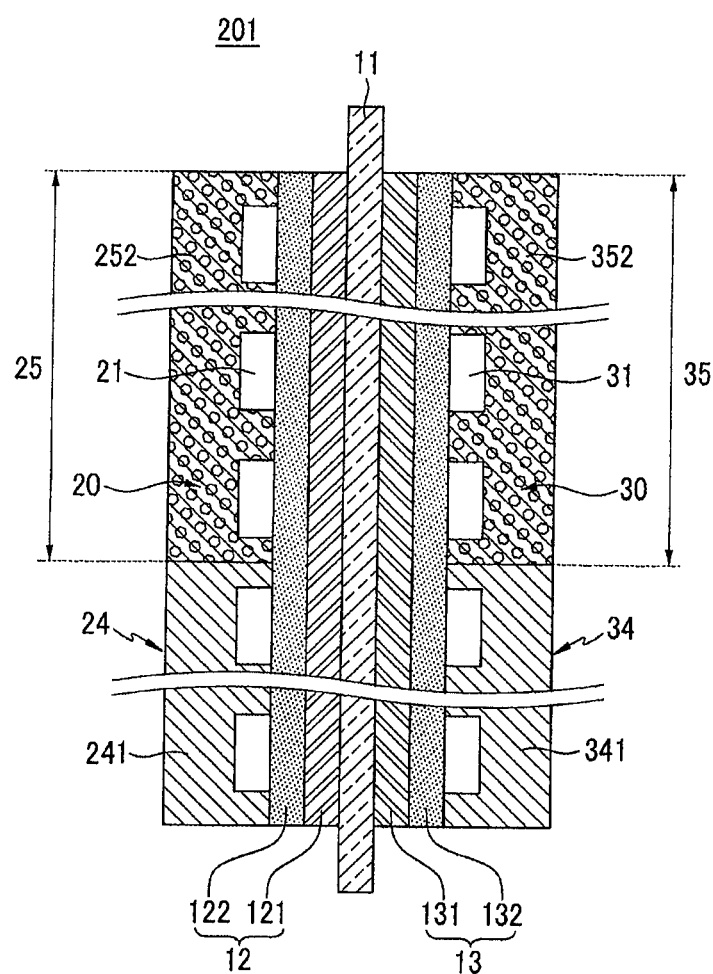
FIG. 7 shows a cross-sectional view of an electricity generator according to an exemplary variation of the second exemplary embodiment of the present invention.

FIG. 7 shows a cross-sectional view of an electricity generator 201 according to an exemplary variation of the second exemplary embodiment of the present invention.

Referring to FIG. 7, the electricity generator 201 is subsequently equivalent to the electricity generator 200 according to the second exemplary embodiment except for thermal conductors 252 and 352 so no repeated description will be provided.

The second parts 25 and 35 of the electricity generator 201 according to the present exemplary embodiment can include the thermal conductors 252 and 352 including at least one thermal conductor having thermal conductivity that is less than the thermal conductivity of the configuration forming the first parts 24 and 34. In other words, the second parts 25 and 35 can be generated by including at least one thermal conductor having thermal conductivity that is greater than the thermal conductivity of the first parts 24 and 34.

In this instance, the cathode and anode separators 20 and 30 according to the present exemplary embodiment can be formed by including a metal so the thermal conductivity of the cathode and anode separators 20 and 30 can be several to several tens of times greater than the thermal conductivity of the separators according to the first exemplary embodiment.

Also, the first parts 24 and 34 and the second parts 25 and 35 can be separately manufactured so it is possible to integrally combine the first parts 24 and 34 and the second parts 25 and 35 and use them for the electricity generator 201.

Therefore, the thermal conductivity of the second parts 25 and 35 becomes greater than the thermal conductivity of the first parts 24 and 34 so the temperature distribution of the first parts 24 and 34 can be substantially equivalent to the temperature distribution of the second parts 25 and 35.

Here, materials that can be coated on the second part 25 and 35 include, for example, aluminum (with thermal conductivity of substantially 250 W/(m·K)), copper (with thermal conductivity of substantially 401 W/(m·K)), gold (with thermal conductivity of substantially 310 W/(m·K)), and nickel (with thermal conductivity of substantially 91 W/(m·K)).

Also, although not described in the present exemplary embodiment, the present invention can include second parts 25 and 35 including a configuration having thermal conductivity that is greater than the thermal conductivity of the cathode and anode separators 20 and 30 and first parts 24 and 34 formed inclusive of a configuration having thermal conductivity that is less than the thermal conductivity of the cathode and anode separators 20 and 30. In this instance, since the first parts 24 and 34 and the second parts 25 and 35 can be separately manufactured, the first parts 24 and 34 and the second parts 25 and 35 can be integrally combined and be used for the electricity generator 201.

In other words, when the first parts 24 and 34 are formed inclusive of a material having thermal conductivity that is less than the thermal conductivity of the cathode and anode separators 20 and 30 and the second parts 25 and 35 are formed inclusive of a thermal conductor having thermal conductivity that is greater than the thermal conductivity of the cathode and anode separators 20 and 30 according to the thermal conductivity of the cathode and anode separators 20 and 30, the temperatures of the first parts 24 and 34 and the second parts 25 and 35 can be maintained at a substantially equivalent value.

Figure 8:
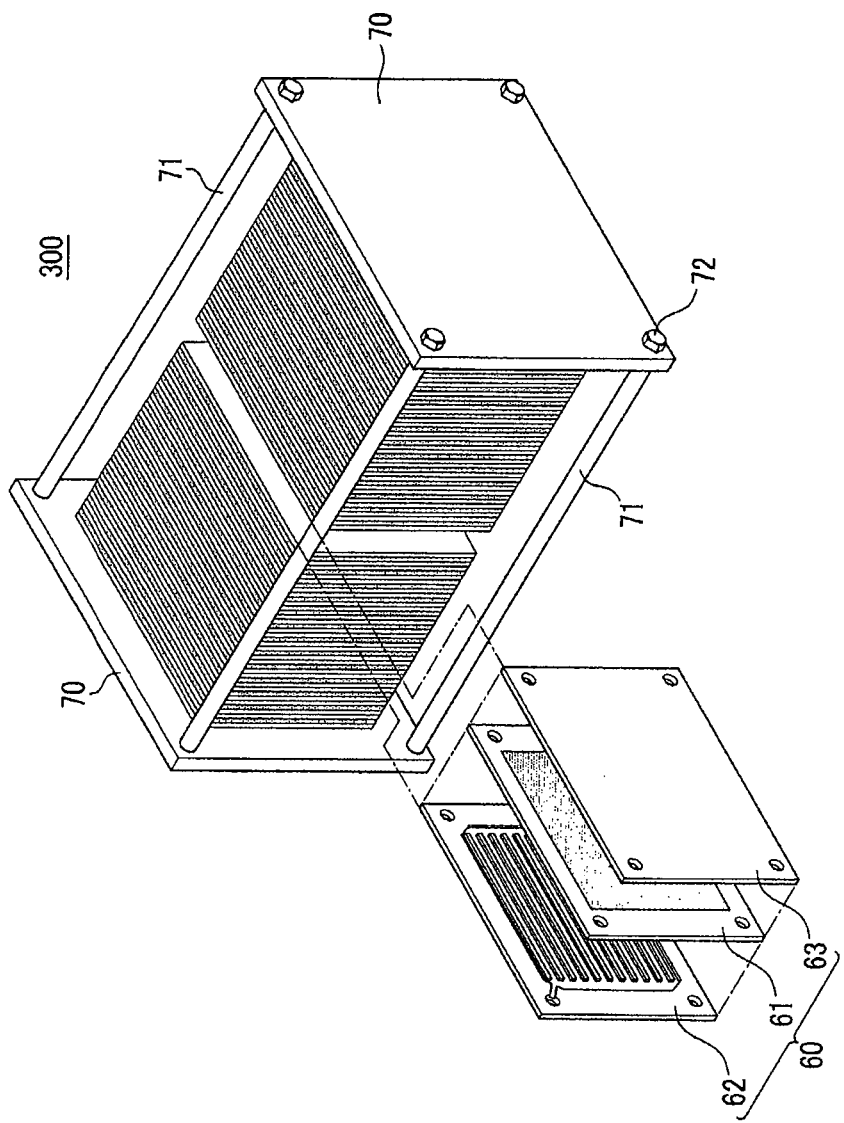
FIG. 8 shows a perspective view of a fuel cell stack according to a third exemplary embodiment of the present invention.
Figure 9:
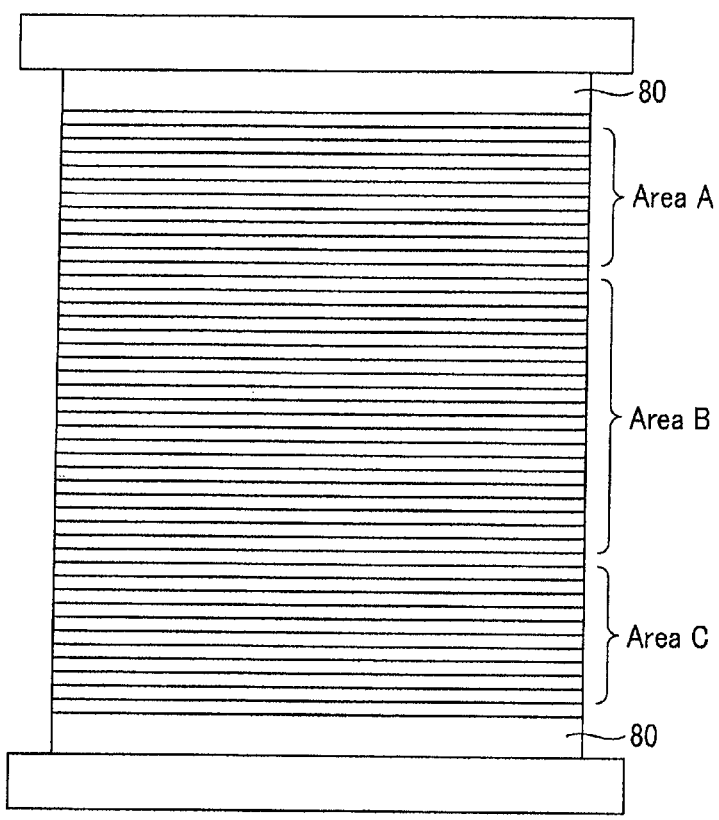
FIG. 9 shows a cross-sectional view of the fuel cell stack of FIG. 8.

FIG. 8 shows a perspective view of a fuel cell stack 300 according to a third exemplary embodiment of the present invention, and FIG. 9 shows a cross-sectional view of the fuel cell stack 300 of FIG. 8.

Referring to FIG. 8 and FIG. 9, the fuel cell stack 300 includes a plurality of electricity generators 60 and a pair of end plates 70 provided at the outermost position of the electricity generators 60 and pressurizing and supporting the electricity generators 60.

Each electricity generator 60 includes at least one membrane electrode assembly 61 and a plurality of cathode separators 62 and anode separators 63 located near a respective membrane electrode assembly 61.

Regarding the fuel cell stack 300, a pair of end plates 70 is located close to the electricity generators 60 that are provided at the outermost position, and can be firmly assembled by a fastening means such as a bolt 72 passing through a plurality of supports 71 and the end plate 70. In one embodiment, an insulation member 80 can be installed between the end plate 70 and the electricity generators 60 provided at the outermost position.

The cathode separator 62 and the anode separator 63 can be combined with a thermal conductor including materials that have different thermal conductivity.

In detail, referring to FIG. 9, the fuel cell stack 300 includes an area A provided near an upper end plate 70, an area C provided near a lower end plate 70, and an area B provided between the area A and the area C. Therefore, the temperature following the heat that occurs when the electricity generator 60 generates electricity can be the greatest in the area B provided between the area A and the area C.

In one embodiment, the cathode separator 62 and the anode separator 63 provided in the area A and the area C can be combined with at least one thermal conductor having thermal conductivity that is greater than the thermal conductivity of the separators 62 and 63.

Also, since the cathode and anode separators 62 and 63 can be formed inclusive of a metal, their thermal conductivity can be several to several tens of times the thermal conductivity of the separators 20 and 30 according to the first exemplary embodiment.

In this instance, the materials that can be combined in the areas A and C include, for example, aluminum (with thermal conductivity of substantially 250 W/(m·K)), copper (with thermal conductivity of substantially 401 W/(m·K)), gold (with thermal conductivity of substantially 310 W/(m·K)), and nickel (with thermal conductivity of substantially 91 W/(m·K)).

Here, the thermal conductor can be combined with the separators 62 and 63 by impregnating the separators 62 and 63 with the melted thermal conductor and coating the same or by integrally including the thermal conductor in the components that make up the separators 62 and 63 when the separators 62 and 63 are manufactured.

Accordingly, the cathode separator 62 and the anode separator 63 in the area A and the area C are combined with a material having thermal conductivity that is greater than that of the separator, so the temperature distribution of the areas A, B, and C can be substantially equivalent.

According to another exemplary variation of the present exemplary embodiment, the cathode separator 62 and the anode separator 63 provided in the area B can be combined with at least one thermal conductor having thermal conductivity that is less than the thermal conductivity of the separators 62 and 63. In this instance, the thermal conductivity of the separators 62 and 63 can be substantially 250 W/(m·K) in a like manner of the first exemplary embodiment.

Also, thermal conductors that can be combined with the first parts 24 and 34 include, for example, polypropylene (with thermal conductivity of substantially 0.1-0.22 W/(m·K)), polyethylene (with thermal conductivity of substantially 0.42-0.51 W/(m·K)), and vinyl ester (with thermal conductivity of substantially 0.25 W/(m·K)).

In this instance, the thermal conductor can be coated on the separators 62 and 63 in the area B by impregnating the separators 62 and 63 with the melted thermal conductor, or the thermal conductor can be integrally included as one of the components making up the separators 62 and 63 when the separators 62 and 63 are manufactured.

Therefore, the thermal conductivity of the separators 62 and 63 in the areas A and C becomes lower than the thermal conductivity of the separators 62 and 63 in the area B so the temperature distributions in the areas A, B, and C are substantially equivalent.

Also, as the other exemplary variation of the present exemplary embodiment, it is possible to combine a material of which the thermal conductivity is greater than that of the separators 62 and 63 with the cathode separator 62 and the anode separator 63 provided in the areas A and C, and also combine at least one thermal conductor of which the thermal conductivity is less than the thermal conductivity of the separators 62 and 63 with the cathode separator 62 and the anode separator 63 provided in the area B.

Therefore, the temperature distributions of the area A, the area B, and the area C can be substantially maintained by changing the conductivity of the thermal conductor combined in the areas A and C and the thermal conductor combined in the area B according to the thermal conductivity of the separators 62 and 63.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electricity generator comprising:
   a membrane electrode assembly;
   a separator comprising a fuel inlet and a fuel outlet, and having a lower region extending from a lower edge of the separator and including the fuel outlet, and an upper region adjacent the lower region, extending from an upper edge of the separator, and including the fuel inlet, the lower region and the upper region together being an entirety of the separator; and
   a first thermal conductor on and entirely covering only the lower region from among the upper and lower regions,
   wherein the separator further has a first side and a second side, and the separator is coupled to the membrane electrode assembly at the first side thereof and the first thermal conductor is only at the second side of the separator from among the first and second sides thereof.

2. The electricity generator of claim 1, wherein the separator comprises:
   a first separator comprising the fuel inlet and the fuel outlet; and
   a second separator comprising an oxidant inlet and an oxidant outlet, wherein the lower region includes the oxidant outlet and the upper region includes the oxidant inlet.

3. The electricity generator of claim 2, wherein the first thermal conductor has a thermal conductivity that is less than a thermal conductivity of the separator, and wherein the first thermal conductor is coated on the lower region.

4. The electricity generator of claim 2, wherein the first thermal conductor has a thermal conductivity that is less than a thermal conductivity of the separator, and wherein the first thermal conductor is integral with the lower region.

5. The electricity generator of claim 2, further comprising a second thermal conductor having a thermal conductivity that is greater than a thermal conductivity of the separator, and wherein the second thermal conductor is coated on the upper region.

6. The electricity generator of claim 2, further comprising a second thermal conductor having a thermal conductivity that is greater than a thermal conductivity of the separator, and wherein the second thermal conductor is integral with the upper region.

\* \* \* \* \*